F. WHITE.
MANUFACTURE OF CONFECTIONS.
APPLICATION FILED DEC. 9, 1912.
1,136,074.
Patented Apr. 20, 1915.
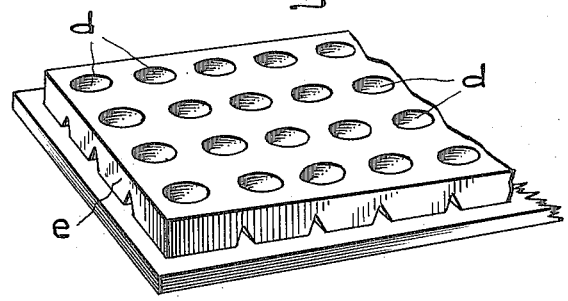
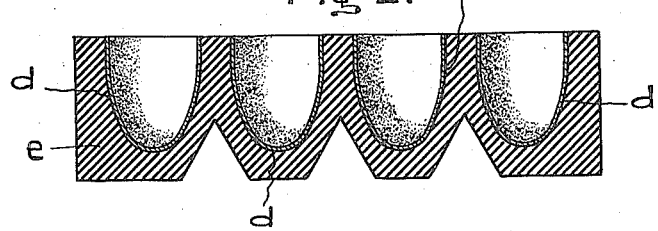
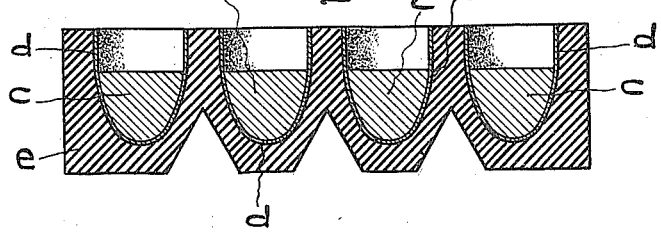
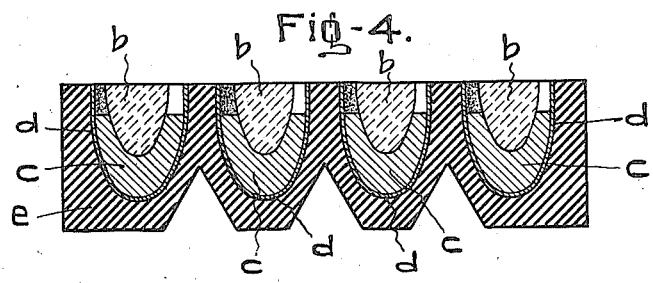
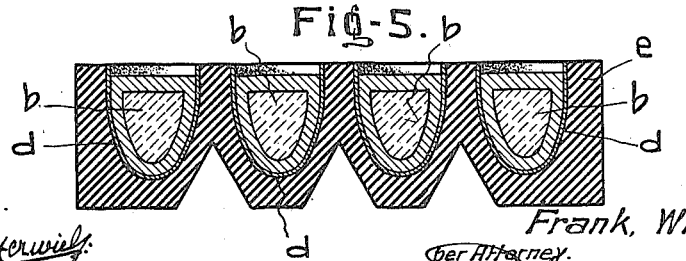
Witnesses.
Frank White, Inventor.

UNITED STATES PATENT OFFICE.

FRANK WHITE, OF ST. JOHN, NEW BRUNSWICK, CANADA.

MANUFACTURE OF CONFECTIONS.

1,136,074.   Specification of Letters Patent.   Patented Apr. 20, 1915.

Application filed December 9, 1912. Serial No. 735,796.

*To all whom it may concern:*

Be it known that I, FRANK WHITE, of the city of St. John, in the Province of New Brunswick, Dominion of Canada, (post-office address 239 Wentworth street,) subject of the King of Great Britain, have invented certain new and useful Improvements in the Manufacture of Confections; and I do hereby declare that the following is a full, clear, and exact description thereof.

My invention relates particularly to the coating with chocolate and other suitable substances, of creams of assorted flavors, nuts, fruits, marshmallows, caramels and other confection-ingredients and combinations of ingredients; and it has for its object to mold coated confections of any desired design or configuration.

The invention may be said briefly to consist in partially filling a series of matrices with molten substance suitable for coating the confection, such as chocolate for instance, and, while the coating substance is still fluid, the centers or fillings are pressed into the contents of the different matrices, the effect being that the coating substance is caused to flood over and completely submerge the centers or fillings. The confection thus coated is then allowed to stand until firmly set; and, finally, it is removed from the matrices. For full comprehension, however, of my invention, reference must be had to the accompanying drawings forming a part of this specification, in which similar reference characters indicate the same parts, and wherein:

Figure 1 is a perspective view of a suitable rubber mold having a plurality of matrices and supported on a tray of inelastic material, preferably wood; Fig. 2 is a vertical sectional view taken on a line through a row of matrices prepared for the process; Fig. 3 is a similar view with the matrices charged with the proper quantity of coating substance, the first step of the process; and Figs. 4 and 5 are also similar views to Fig. 2, and illustrating the action of the coating substance when the centers or fillings are being inserted, and, when the latter are submerged, respectively, these figures illustrating the second and third steps of the process.

Before carrying out the process, the centers or fillings $b$ and coating substance $c$ must first be prepared in the usual way according to any preferred recipes and methods, and the matrices $d$ of the rubber molds $e$ are glazed with a solution of white shellac, alcohol and vanilla-bean which is applied preferably by using a soft brush. The object of this glazing is to impart a glossy finish to the confections. The best results are obtained by using a depositor for charging the molds with the chocolate or other coating substance, and the quantity deposited must be gaged according to the relative cubical contents of the matrices and centers or fillings. Care must also be taken to make the centers or fillings sufficiently smaller than the matrices to provide when in the matrices the required space to contain the necessary thickness of coating substance. These centers or fillings may be cut or cast or otherwise formed in any well known way. When the centers or fillings are ready to be coated, the chocolate or other coating substance, which in the meantime has been prepared, is charged into the depositor and the gage of the latter set to cast the amount required. The rubber mold carried on the wooden tray is then placed in position to have its matrices charged with the chocolate or other coating substance, and the matrices are thus charged. The tray with the mold thereon is then placed on a table nearby where the required help is waiting with the centers or fillings ready. The help then presses the centers or fillings into the fluid coating-substance contained in the matrices until it flows over and completely submerges them, care being taken to keep the centers or fillings in the middle of the matrices and not to press them too deeply into the latter, which would have the undesirable effect of presenting a coating of uneven thickness. The tray with the mold thereon is then carried into the cooling room and allowed to remain there until the confections are firmly set. When taken from the mold each confection, whether chocolate-drops, chocolate coated nuts, marshmallows or ginger, or candy-coated fruits, nuts, chewing-gum or other confections, will have imparted thereto the precise design of the matrices, without mark or blemish of any kind, and having a glossy finish.

Important advantages are that any design will be perfectly reproduced from the matrices, and unskilled labor may be employed.

What I claim is as follows:—

The method of molding confections, consisting in first partially filling a matrix with a molten substance, then pressing the article to be coated into and below the surface of the fluid substance thus completely submerging the article, placing the matrix with the confection therein to one side until set, and finally removing the coated confections from the mold.

In testimony whereof I have signed my name to this specification in the presence of two witnesses.

Montreal, November 26, 1912.

FRANK WHITE.

Witnesses:
 HERBERT J. SMITH,
 IRA B. RATHBURN.